2,909,459
PRESERVATIVE COMPOSITION COMPRISING PYRIDINETHIONE AND A SOLUBLE BORATE

Almon G. Hovey, Northford, Conn., assignor to Olin Mathieson Chemical Corporation, New Haven, Conn., a corporation of Virginia No Drawing. Application May 22, 1956
Serial No. 586,351

4 Claims. (Cl. 167—33)

This invention relates to stabilized pyridinethione compositions, and has for its object the provision of stabilized anti-fungal and anti-bacterial compositions containing pyridinethiones. Pyridinethiones which are used in the compositions of the invention include compounds represented by the general formula:

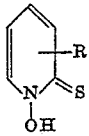

where R represents a member of the group consisting of hydrogen, lower alkyl, (lower alkyl)-oxy and halo; alkali and other metal salts thereof; and derivatives such as the disulfide. It is understood that the compounds of the above formula may be in tautomeric equilibrium with the corresponding N-oxide, i.e.

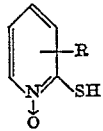

and such forms of the compounds are included in the general formula. Such compounds are described and claimed in the Shaw et al. Patent No. 2,686,786, wherein their anti-fungal and anti-bacterial properties are also described.

While the said compounds are known to have very effective anti-fungal and anti-bacterial properties, there has been need for improvement in the active life, particularly in the presence of proteinaceous material. Various materials have been used or proposed to prolong their activity when in contact with proteinaceous material, but these have not been entirely successful mainly because of the large amounts and thus, increased costs, which were involved.

This invention is based upon my discovery that the addition of small amounts of soluble borates, such as sodium tetraborate (borax) or metaborate to the pyridinethiones will prolong their effectiveness for anti-fungal and anti-bacterial purposes when used in contact with proteinaceous or like material subject to putrefactive decomposition, as in aqueous solutions thereof.

The compositions of the invention may be prepared by intermixing a pyridinethione with a relatively small amount of solid borate or by preparing aqueous solutions of a pyridinethione to which borax has been added in the desired concentrations and proportions.

The sodium, zinc, copper, ammonium, potassium and calcium salts of pyridinethione have been found to be particularly effective in aqueous solutions containing from around 1000 to 2500 parts per million (p.p.m.) of soluble borate. While borax (sodium tetraborate) is the preferred borate, the tetraborates of potassium, lithium and other metals and the metaborates of the alkali metals and other metals may be used advantageously in compositions of this invention.

Series of tests were carried out using various toxicants in comparison with a pyridinethione in different concentrations, alone and with different amounts of borate and other salts in aqueous solutions containing 10% casein or soy protein in dispersion. The casein solutions used in the tests consisted of 20 parts of casein to 180 parts of water, the water containing enough ammonia to aid in the dispersion of the casein.

The samples were stored in closed containers which were opened periodically to be tested for effectiveness. Those samples in which the salt of pyridinethione has lost its effectiveness have a characteristic putrid odor.

The following tables show the results using various stabilizers in maintaining the effectiveness of the sodium salt of pyridinethione at low levels of concentration in aqueous solutions containing protein in dispersion. The control contained only 10% protein in solution. (In the tables SSP=sodium salt of pyridinethione, and p.p.m.= parts per million in solution.)

Salts other than the borates such as sodium bicarbonate, acetate, phosphates, thiosulfate and sulphite were much less effective in accomplishing stabilization of the pyridinethione nucleus.

*Table 1 (10% casein dispersion in water)*

| Toxicant | p.p.m. | Stabilizer | p.p.m. | Number of days Preserved |
|---|---|---|---|---|
| SSP | 500 | None | | 145+ |
| SSP | 40 | do | | 55 |
| SSP | 35 | do | | 50 |
| SSP | 25 | do | | 40 |
| SSP | 10 | do | | 14 |
| SSP | 5 | do | | 6 |
| Control | 0 | do | | 5 |
| None | | Borax | 2,500 | 8 |
| Phenol | 2,500 | None | | 7 |
| Mercuric Chloride | 100 | do | | 15 |
| Phenol | 2,500 | Borax | 2,500 | 25 |
| SSP | 10 | do | | 300 | 45 |
| SSP | 25 | do | | 2,500 | 145+ |
| SSP | 8 | do | | 1,000 | 115+ |
| SSP | 100 | do | | 1,000 | 115+ |
| SSP | 50 | do | | 2,500 | 115+ |
| SSP | 100 | do | | 2,500 | 115+ |

*Table 2 (10% soy protein dispersion in water)*

| Toxicant | p.p.m. | Stabilizer | p.p.m. | Number of days Preserved |
|---|---|---|---|---|
| SSP | 500 | None | | 165+ |
| SSP | 40 | do | | 125 |
| Control | | | do | | 5 |
| Mercuric chloride | 41 | do | | 21 |
| SSP | 25 | Borax | 2,500 | 165+ |

The experiments summarized in the tables show conclusively that the compositions in accordance with the invention (the last six of Table 1 and the last one of Table 2) display a significant improvement of the stability of the pyridinethione nucleus effected by the soluble borate. Conjoint use of the toxicant and soluble borate stabilizer effects fully as effective preservative action by a small concentration of toxicant as would otherwise require a ten or twenty-fold greater concentration.

While the explanation of the above synergistic effect is not known with certainty, it may be at least in part due to some coordination between the pyridinethione and the borate or to buffering action of the latter tending to maintain a mildly alkaline condition.

The compositions of the invention may be used effectively as a preservative against fungal and bacterial organisms in such materials as paints, for example water paints, calcimines, soy protein paints, latex paints, protein glues such as casein or soy protein glues, leather, pulp and paper, textiles, agricultural products such as plant sprays and in other commercial products containing an aqueous solution or dispersion of proteinaceous or like material which is otherwise subject to putrefactive decomposition.

I claim:

1. The anti-fungal and anti-bacterial composition for use in aqueous solutions containing proteinaceous material comprising up to about 100 parts per million of a pyridinethione and, in addition, a soluble borate.

2. The anti-fungal and anti-bacterial composition for use in aqueous solutions containing proteinaceous material comprising up to about 100 parts per million of a pyridinethione of the general formula:

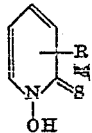

wherein R represents a member of the group consisting of hydrogen, lower alkyl, (lower alkyl)-oxy and halo; and metal salts thereof, and in addition, a soluble borate.

3. The anti-fungal and anti-bacterial composition comprising up to about 100 parts per million of sodium pyridinethione and, in addition, borax.

4. The anti-fungal and anti-bacterial composition for use in aqueous solutions containing proteinaceous material comprising up to about 100 parts per million of pyridinethione and at least about 1000 to 2,500 parts per million of a soluble borate.

References Cited in the file of this patent
UNITED STATES PATENTS

| | | |
|---|---|---|
| 2,157,113 | Carswell | May 9, 1939 |
| 2,280,546 | Schuler | Apr. 21, 1942 |
| 2,686,786 | Shaw et al. | Aug. 17, 1954 |
| 2,742,393 | Bernstein et al. | Apr. 17, 1956 |